United States Patent [19]

Berisch

[11] 4,279,448
[45] Jul. 21, 1981

[54] BRAKE POWER CONTROL UNIT FOR TWO-CIRCUIT BRAKE SYSTEMS INCORPORATING A LOCKING PISTON OPERATED HYDRAULICALLY

[75] Inventor: Volker Berisch, Hattersheim, Fed. Rep. of Germany

[73] Assignee: ITT Industries, Inc., New York, N.Y.

[21] Appl. No.: 135,580

[22] Filed: Mar. 31, 1980

[30] Foreign Application Priority Data

Apr. 14, 1979 [DE] Fed. Rep. of Germany ....... 2915293

[51] Int. Cl.$^3$ .............................................. B60T 8/02
[52] U.S. Cl. ..................................... 303/6 C; 188/349; 303/22R
[58] Field of Search ............ 303/6 C, 6 R, 52, 22 R, 303/22 A, 84 A, 84 R; 188/349, 151 A

[56] References Cited

U.S. PATENT DOCUMENTS

| | | | |
|---|---|---|---|
| 3,441,318 | 4/1969 | Bueler | 303/6 C |
| 3,608,977 | 9/1971 | Kersting | 303/6 C |

FOREIGN PATENT DOCUMENTS 2427506 1/1975 Fed. Rep. of Germany .

Primary Examiner—Douglas C. Butler
Attorney, Agent, or Firm—John T. O'Halloran; Alfred C. Hill

[57] ABSTRACT

Brake power control units for two-circuit brake systems are known in which a control piston and a locking piston are provided. The control piston reduces the brake pressure of the rear axle brake circuit in relation to the brake pressure of the front axle brake circuit and the locking piston acts on the control valve in the case of failure of the front axle brake circuit in such a way that the reducing effect for the rear axle brake pressure is neutralized. The two pistons of this known unit are arranged one behind the other which requires a great overall length for the control unit. According to the present invention, the overall length of the control unit is reduced by disposing the two pistons coaxial with respect to each other with the control piston enclosing the locking piston.

7 Claims, 1 Drawing Figure

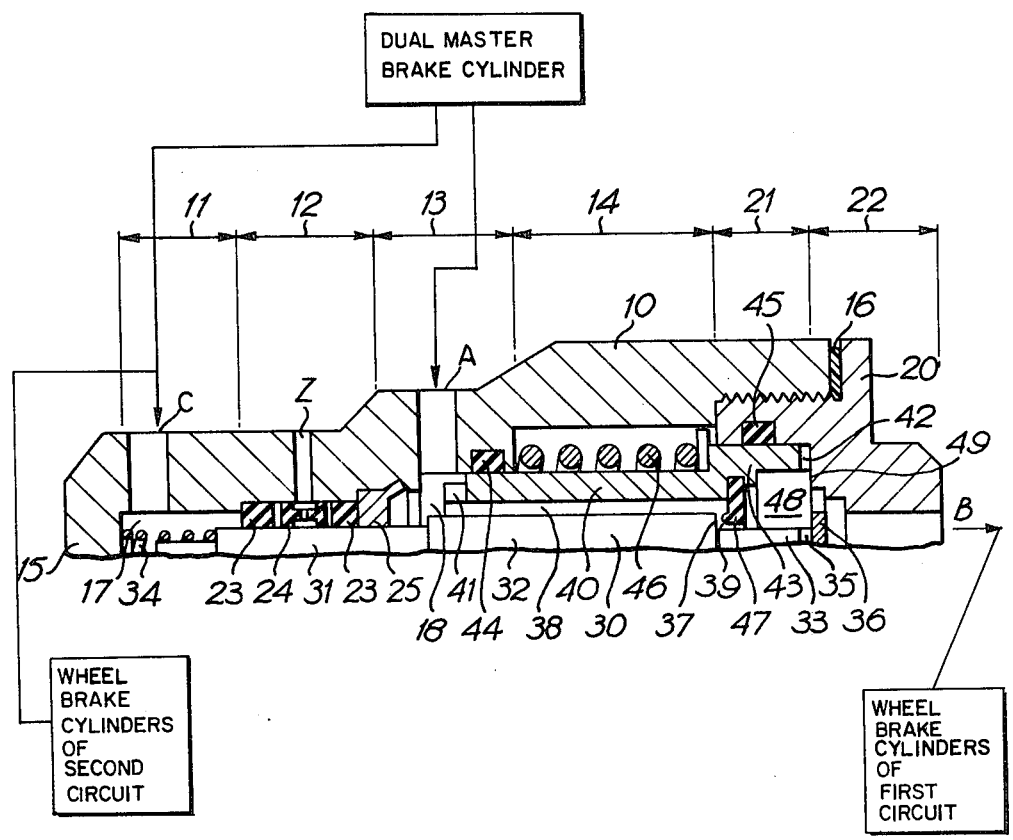

BRAKE POWER CONTROL UNIT FOR TWO-CIRCUIT BRAKE SYSTEMS INCORPORATING A LOCKING PISTON OPERATED HYDRAULICALLY

BACKGROUND OF THE INVENTION

The present invention relates to a brake power control unit for two-circuit brake systems in which a first brake circuit is directly connected to the master brake cylinder without change in pressure and a second brake circuit is connected to the master brake cylinder via the pressure modulating element of the control unit, wherein the brake pressure in the second brake circuit, after a certain changeover pressure determined by the surfaces of a control piston and the force of a spring acting on the control piston has been exceeded, is changed in a relation determined by the control piston, with a locking piston operated hydraulically for neutralizing or locking the pressure change in the controlled brake circuit in case of failure of the uncontrolled brake circuit.

The brake power control unit can be designed as a single-stage or continuously working brake power control unit. The single-state brake power control units, which limit the pressure of the controlled brake circuit to a certain value, are in general called brake power limiters. In these brake power limiters only one end of the control piston has pressure applied thereto, e.g. the controlled pressure. A spring, which together with the surface to which pressure is applied determines the change-over pressure, acts against the force produced by the controlled pressure. In the brake power control unit working continuously the second end of the control piston also has pressure applied thereto, namely the pressure to be controlled. The force produced by this brake power control unit acts in the same direction as the spring force.

In general brake power control units are known. For instance, German Pat. DE-OS No. 24 27 506, published Jan. 9, 1975 shows a continuously working brake power control unit. In this brake power control unit the uncontrolled brake circuit is assigned to the front wheels and the pressure in this first brake circuit acts on the locking piston. The brake pressure to be controlled and the controlled brake pressure act on the control piston from opposite ends. A spring also acts on the control piston in the same direction as the pressure to be controlled. The reduction of the brake pressure in the controlled circuit is determined by this and by the size of the active piston surfaces. If the first brake circuit fails, the pressure of the first brake circuit acting on the locking piston breaks down and this piston is shifted by the controlled brake pressure. Since the locking piston and the control piston are connected to one another via a coupling the valve closed by the control piston is kept open and the pressure can fully build up in the second brake circuit.

However, this known arrangement has a great overall length.

SUMMARY OF THE INVENTION

An object of the present invention is to provide a brake power control unit or a brake power limiter having a short overall length.

A feature of the present invention is the provision of a brake power control unit for two-circuit brake systems comprising a housing having a longitudinal axis; a control piston disposed within the housing disposed coaxial of the axis to control brake pressure in a first brake circuit, the brake pressure in the first brake circuit being changed in a relationship determined by the control piston after a given change-over pressure determined by active surfaces of the control piston and the force of a first spring operating on the control piston has been exceeded; and a locking piston disposed in said housing coaxial of the axis within the control piston acted upon by brake pressure in a second brake circuit to neutralize pressure changes in the first brake circuit in case of failure of the second brake circuit.

According to another feature of the present invention the brake power control unit is improved by one end of the locking piston forming one part of the control valve and one sealing element of the control piston forming the second part of the control valve.

Appropriately the locking piston is fixed in its rest position by means of a spring in an uncompressed condition.

Furthermore according to another feature of the present invention a stepped piston can be used as the locking piston, wherein one annular surface of the piston step forms one part of the control valve.

By means of the brake power control unit according to the present invention a short overall length is achieved. Furthermore production is simplified since only simple construction elements are used. The brake power control unit can also be produced as a screw-in cartridge so that the construction element can be exchanged. Furthermore, an arrangement according to the present invention ensures that the locking piston is often moved so that a contact corrosion is avoided, which in case of failure of the first brake circuit would keep the locking piston in its normal position and, thus, prevent the full brake pressure from acting in the second brake circuit. With each brake application all seals are stressed or the pistons are moved in relation to the respective seals.

BRIEF DESCRIPTION OF THE DRAWING

The above mentioned and other objects and features of the present invention and the manner of obtaining them will become more apparent by reference to the following description taken in conjunction with the drawing, the single FIGURE of which illustrates a longitudinal cross-sectional view of an embodiment of the brake power control unit in accordance with the principles of the present invention.

DESCRIPTION OF THE PREFERRED EMBODIMENT

In a housing 10, which can also be designed as a screw-in cartridge, the individual elements of the brake power control unit are arranged. Housing 10 enlarges in steps from the closed end 15.

In the interior housing 10 also enlarges in steps and the interior of housing 10 can be subdivided into sections 11, 12, 13 and 14.

Housing 10 is closed by means of the screw cap 20 and a seal 16. The interior of cap 20 decreases in steps and can be subdivided into the sections 21 and 22. The locking piston 30 is disposed with housing 10 and is axially slideably therein. The spring 34 is disposed between closed end 15 and locking piston 30. The other end of locking piston 30 abuts the spring ring 36 in its rest position.

At the end of locking piston 30 adjacent spring ring 36, elevations 35, e.g. teeth or the like, are advantageously provided. Locking piston 30 can be subdivided into three sections 31, 32 and 33, wherein the sections 31 and 33 have a smaller diameter than section 32.

In the area 11 of housing 10 the chamber 17 is supplied with pressure via the opening C for the uncontrolled brake circuit which, for example, may be one circuit of a dual master brake cylinder with the pressure at opening C being directly coupled to the wheel brake cylinder of this circuit. The pressure acts on the front end of the locking piston section 31. The pressure chamber 18, in section 13 of housing 10, is supplied with the pressure to be controlled for the second brake circuit of the dual master brake cylinder via the opening A. Between the two pressure chambers 17 and 18 the seals 23 and the adapter 24 are arranged, which are fixed in their axial position by the holding element 25. Adapter 24 has a circular groove which is connected to the outside air via the bore Z. Should pressure medium penetrate from pressure chamber 17 or 18 to adapter 24, it would flow via bore Z to the outside of housing 10, and thus, would not influence the other pressure chamber. In the area of sections 13, 14 and 21 a stepped ring piston 40 is arranged as the control piston enclosing section 32 of locking piston 30. At both ends elevations 41 and 42, e.g. teeth or the like are provided.

In section 13 control or ring piston 40 is sealed via the seal 44 and in the area 21 via the seal 45 relative to housing 10'. Part 43 of control piston 40 has a greater diameter than the rest of piston 4. Part 43 is acted upon by the spring 46 in an axial direction. Furthermore, a sealing body 47 is provided in control piston 40. Sealing body 47 forms in connection with the surface 37 of locking piston 30 a control valve 39 for pressure reduction of the pressure supplied thereto. The pressure chamber 48 lying behind sealing body 47 is connected to the outlet B for the controlled pressure of the second brake circuit which, for example, is connected to wheel brake cylinders of this brake circuit.

The brake power control unit shown in the FIGURE operates as following. In the rest position, e.g. when the control unit is not supplied with pressure, locking piston 30 is in the position shown and abuts spring ring 36 with its elevations 35. Control piston 40 also is in the position shown and abuts surface 49 in cap 20 with elevations or stops 42.

When pressure is supplied via openings A and C, the pressure supplied via C acts on the front end of locking piston section 31. This pressure supports the action of spring 34. The pressure supplied via opening A reaches pressure chamber 48 via pressure chamber 18, the interspace 38 between control piston 40 and locking piston 30, through the open control valve 39 and from here reaches the second brake circuit via connection B. The pressure acting in pressure chamber 18 acts on the adjacent end of control piston 40 and on the adjacent surface of body 47 in the same direction as spring 46. The pressure prevailing in pressure chamber 48 acts on the end surface of part 43 of control piston 40 and on the adjacent surface of sealing body 47. The pressure prevailing in pressure chamber 48 tries to move control piston 40 to the left as seen in the drawing. However, this is possible only when the force produced is greater than the force exerted on the previous named surface by the pressure in pressure chamber 18 and the force produced by spring 46. As soon as this overall force is exceeded by the force produced in pressure chamber 48, control piston 40 is moved to the left and control valve 39 closes. As soon as the pressure supplied via connection A further increases piston 40 moves to the right and into the pressure chamber 48 and thus another pressure increase is produced in the second brake circuit.

When the braking effect is being finished the pressure at connections A and C is reduced corresponding to the actuation of the brake pedal. The pressure in chamber 48 and, thus, in the second brake circuit cannot immediately follow this pressure reduction since control valve 39 is closed. By the pressure prevailing in chamber 48 not only control piston 40 but also locking piston 30 is moved to the left. As soon as the shift to the left of locking piston 30 is longer than the shift to the left to control piston 40, valve 39 opens and the pressure in chamber 48 and, thus, in the second brake circuit can diminish via connection A. Consequently, locking piston 30 is moved with every releasing of the brake so that a contact corrosion is avoided.

When the pressure in the brake circuit connected to connection C breaks down or fails locking piston 30 is moved to the left towards spring 34 as a result of the forces acting in pressure chamber 48 since there are no opposing forces in pressure chamber 17. Control valve 39 is opened and the pressure supplied via connection A becomes fully active in the second control circuit, which is normally controlled.

In addition, it should be pointed out that, to further simplify the brake power control unit shown, seal 16 may be omitted. Spring ring 36 also may be omitted if in cap 20 an oblique bore is provided and locking piston 30 is directly supported by cap 20. Furthermore, spring 34 may be omitted if locking piston 30 between the two seals 23 is designed in steps. Locking piston 30 is then with the production of pressure shifted into the right position of readiness. In the design of the brake power control unit as a screw-in cartridge an axial inlet for the uncontrolled pressure is provided at the closed end 15 and the uncontrolled pressure leaves housing 10 through opening C.

While I have described above the principles of my invention in connection with specific apparatus it is to be clearly understood that this description is made only by way of example and not as a limitation to the scope of my invention as set forth in the objects thereof and in the accompanying claims.

I claim:

1. A brake power control unit for two-circuit brake systems comprising:

a housing having a longitudinal axis;

a control piston disposed within said housing disposed coaxial of said axis to control brake pressure in a first brake circuit, the brake pressure in said first brake circuit being changed in a relationship determined by said control piston after a given change-over pressure determined by active surfaces of said control piston and the force of a first spring operating on said control piston has been exceeded; and a locking piston disposed in said housing coaxial of said axis having a major portion thereof within a major portion of said control piston, said locking piston being acted upon by brake pressure in a second brake circuit to neutralize pressure changes in said first brake circuit in case of failure of said second brake circuit.

2. A control unit according to claim 1, wherein a sealing body secured to the inner surface of said control piston provides one part of a control valve and a cooperating annular surface of said locking piston spaced from an adjacent end surface thereof provides the other part of said control valve.

3. A control unit according to claim 1, wherein
said control piston is a stepped piston, the smaller annular surface of said stepped piston is acted upon by the pressure in said first brake circuit to be controlled and the larger annular surface of said stepped piston is acted upon by the controlled pressure in said first brake circuit.

4. A control unit according to claim 1, wherein
said locking piston is fixed in its rest position by a second spring.

5. A control unit according to claim 1, wherein
said locking piston is stepped between a first inlet in said housing for said second brake circuit and a second inlet in said housing for said first brake circuit.

6. A control unit according to claim 1, wherein
said locking piston is a multiple stepped piston and the annular surface of one of said steps of said stepped position spaced from an adjacent end surface thereof provides one part of a control valve.

7. A control unit according to claim 6, wherein
a sealing body is secured to the inner surface of said control piston adjacent said one of said steps of said stepped piston and provides the other part of said control valve.

* * * * *